United States Patent [19]

Gandini

[11] 4,191,466
[45] Mar. 4, 1980

[54] ILLUMINATING SYSTEM FOR COLOR ENLARGEMENT OR COPYING EQUIPMENT

[75] Inventor: Mario Gandini, Brixen, Italy

[73] Assignee: Durst A.G. Fabrik Fototechnischer Apparate, Bozen, Italy

[21] Appl. No.: 959,253

[22] Filed: Nov. 9, 1978

[51] Int. Cl.² ............................................. G03B 27/76
[52] U.S. Cl. ........................................ 355/35; 355/71
[58] Field of Search ..................... 355/32, 35, 36, 71

[56] References Cited

U.S. PATENT DOCUMENTS

| | | | |
|---|---|---|---|
| 2,991,692 | 7/1961 | Kork | 355/35 |
| 3,458,254 | 7/1969 | Aston | 355/35 |
| 3,482,914 | 12/1969 | Misener | 355/36 |
| 3,831,021 | 8/1974 | Muhlogger | 355/35 X |
| 3,883,243 | 5/1975 | Weisglass et al. | 355/35 |

FOREIGN PATENT DOCUMENTS 115427  7/1942  Australia ................................. 355/35

Primary Examiner—Richard A. Wintercorn
Attorney, Agent, or Firm—Cahill, Sutton & Thomas

[57] ABSTRACT

In an illuminating system for color enlargement or copying, three color filters of maximum density and a shutter may be introduced into the light beam in a continuous motion. The direction of travel of the filters is normal to the direction of travel of the shutter. To avoid a change in the color composition of the copying light when only the shutters are adjusted, the effective shape of the shutter introduced into the light beam is varied dependent upon the depth of insertion of the shutter into the light beam. For this purpose, the shutter may comprise two parts: a shutter strip and auxiliary shutter strip, the position of which relative to the corresponding shutter strip is different depending on the depth of insertion.

12 Claims, 9 Drawing Figures

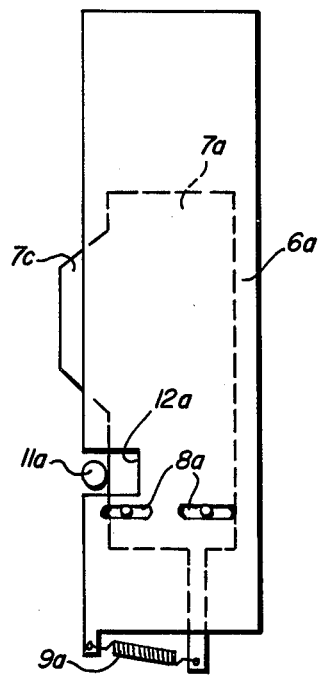
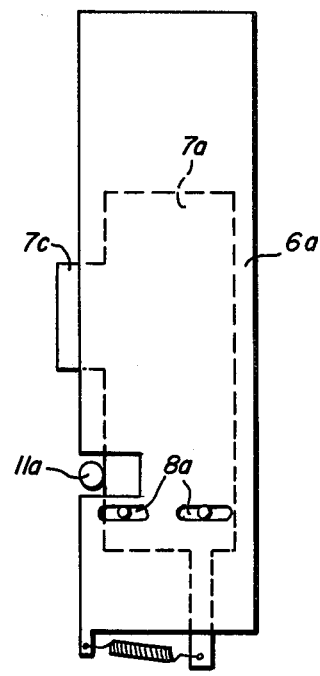
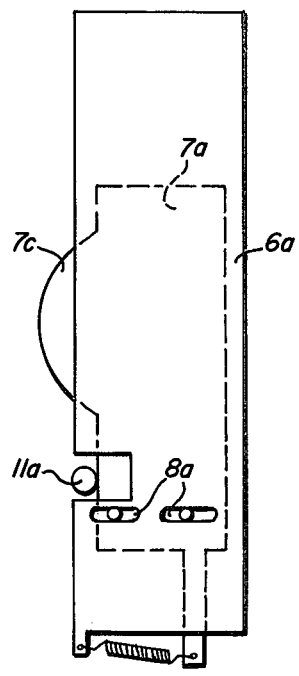
FIG. 3  FIG. 4a  FIG. 4b
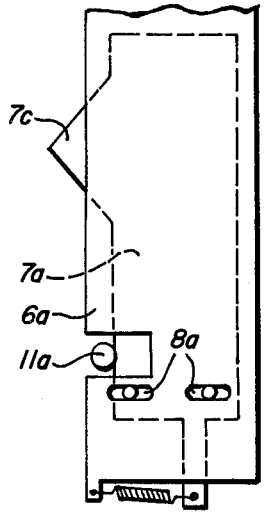
FIG. 4c
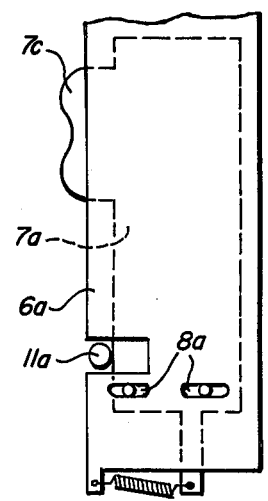
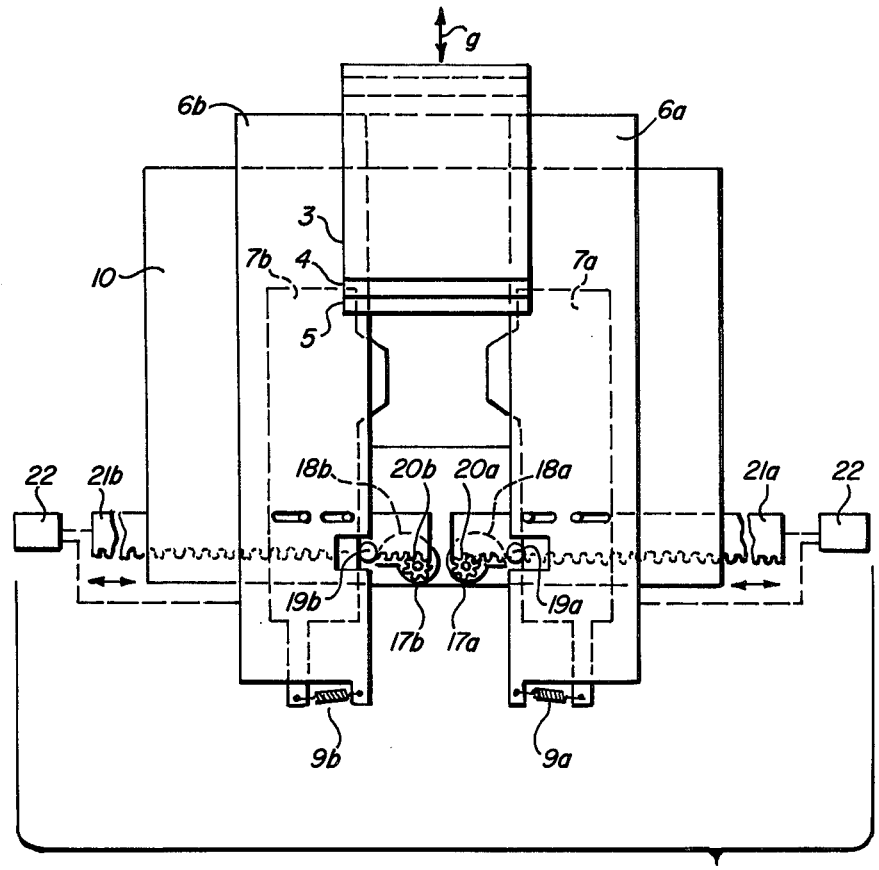
FIG. 4d  FIG. 5

ILLUMINATING SYSTEM FOR COLOR ENLARGEMENT OR COPYING EQUIPMENT

The invention relates to an illuminating system for color enlargement and copying equipment having filters of maximum density which may be introduced in continuous motion into the light emanating from a copying light, and having a shutter which may be introduced into the light beam in a motion normal to that of the filters.

German Patent No. 871554 describes an illuminating system of the type mentioned above, where the light originating from a light source is concentrated by a condensing lens system, passes through a rectangular aperture and through a system consisting of a movable shutter and three filters of maximum density, each in a primary color. The movable shutter consists of one or two shutters whose direction of motion is normal (perpendicular) to the direction of motion of the filters. By proper adjustment of the shutters a continuously variable change in illuminating intensity results at the exit port of the illuminating system. Any physical arrangement other than the location of the filter and shutter in direct proximity to the condenser lens, results in changes of the color composition of the copying light which is unacceptable for the practical requirements. The color composition change occurs any time the light intensity is changed by the movement of the shutters in a direction normal to the direction of motion of the unchanged filters. Such arrangements include the position of filters and shutters between the light source and condenser lens system or where the described system is to be used for the control of light intensity in a system not having a condenser lens, where for example, the color filters are introduced into the light beam originating from a light source with concentrating reflector.

It has been found that it is possible, by changing the shape of the shutters, to reduce the changes in color composition caused by the unequal intensity distribution in the beam cross-section, which is the cause for color changes when using shutters of fixed form. The color correction so achieved is sufficient for all practical requirements while at the same time permitting the light intensity to be varied to the desired degree. The arrangement of the shutters described in this invention is suitable for illuminating systems with condenser lenses as well as for illuminating systems without condenser lenses.

It is therefore an object of the present invention to provide an illuminating system of the above-mentioned type, where the shutters are either located in a place different from the aperture plane of the condenser lens or used in a system not having a condenser, and wherein changes in the shutter position do not result in substantial changes of the color composition of the copying light.

It is another object of the present invention to provide an illuminating system for color enlargement or copying wherein the effective shape of the shutters is changed in accordance with the extent to which the shutters are inserted into the light beam.

These and other objects of the present invention will become apparent to those skilled in the art as the description thereof proceeds.

The present invention may be described with greater specificity and clarity with reference to the following drawings, in which:

FIG. 3 is an illustration of the shutter of FIG. 2 in a different position.

FIGS. 4A, 4B, 4C, and 4D are illustrations of modified shutters for use in the illuminating system of the present invention.

FIG. 5 shows a modified illuminating system constructed in accordance with the teachings of the present invention.

Figure 6:
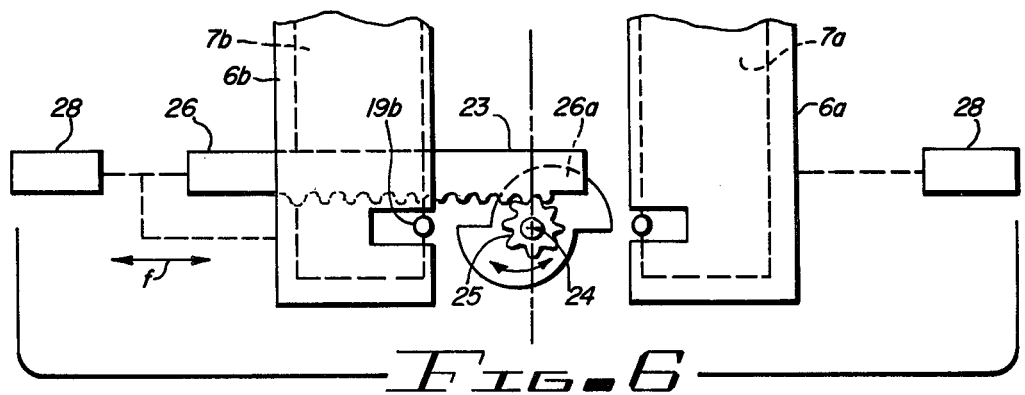

FIG. 6 shows an enlarged view of a modified shutter adjustment system for use in the system of the present invention.

Referring now to the drawings, an illuminating system for photographic enlarging equipment comprises a light source 2 within a reflector 1. Three color filters 3, 4 and 5 of maximum density can be introduced into the light beam in a plane normal to the optical axis in the direction of the arrow g using levers schematically shown at 3a, 4a, 5a. Each of these filters is provided for one different subtractive basic color; for example, filter 3 is a yellow filter, filter 4 is a purple filter and filter 5 is a blue-green filter. Directly after the filters and approximately in the position where the light beam originating from the light source and the reflector has its smallest cross-section, the shutter is positioned, comprising for example, two rectangular strips 6a, 6b which may be moved by any suitable mechanism 6c in a direction normal to the optical axis "a" and normal to the direction of motion of the filters indicated by the arrows "f". The shutter mechanism moves both strips 6a and 6b toward each other to decrease the light intensity, while to increase the light intensity, the shutter strips move away from each other. Located adjacent each strip 6a and 6b, is an auxiliary shutter strip 7a and 7b, respectively, which also moves in the direction of arrows f; however, the auxiliary shutter strips also move in a predetermined relation to the shutter strips 6a and 6b. To allow this movement, auxiliary shutters 7a and 7b are movable in guides 8a and 8b, respectively. The auxiliary shutters 7a and 7b are mounted such that movement relative to the strips 6a and 6b may be varied according to the depth of insertion into the light beam.

Auxiliary shutters 7a and 7b include shaped parts 7c and 7d, respectively. The shaped parts move with the shutter strips 6a and 6b to extend into the light beam. The effective shape of the aperture is therefore changed as the shutter strips extend into the light beam, and the auxiliary shutter strips with their shaped parts also move into the light beam and also move relative to the shutter strips 6a and 6b as will be explained. The best shape for each depth of insertion may be determined empirically in a test series so that between two positions no change occurs in the ratio of the three basic color components. For a certain light source 2 and reflector 1, best results were achieved with an auxiliary shutter whose shaped part 7c, or 7d is shaped like a trapezoid. Other light distribution conditions are possible, where different shapes are better for the auxiliary shutters. In FIGS. 4A to 4D are shown several of such different shapes. FIG. 4A shows a rectangular, FIG. 4B a circular segment, FIG. 4C a triangular shape of part 7c or 7d which may be introduced into the light beam. In FIG.

4D this part is rounded with a central inverted circular segment.

Figure 1:
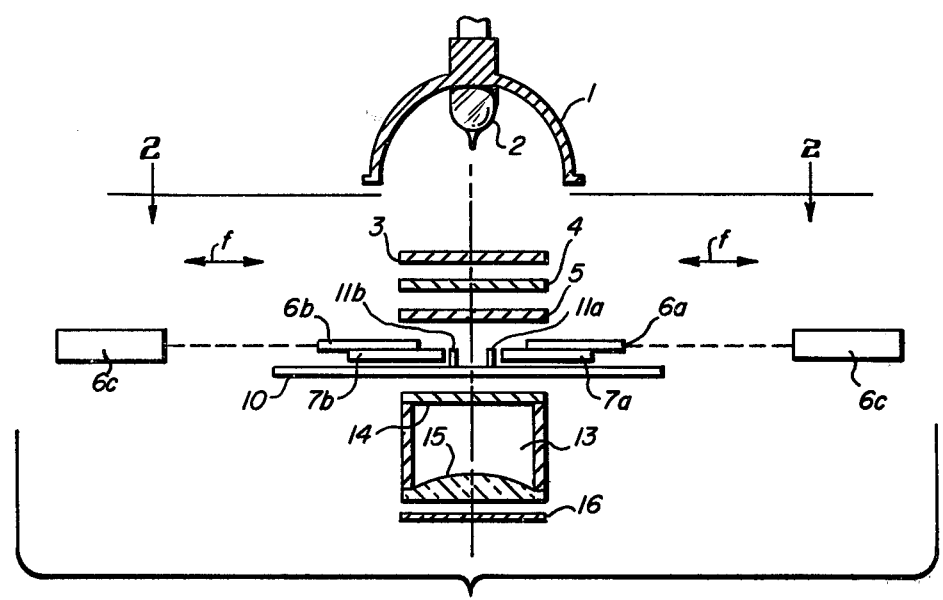
FIG. 1 is a schematic cross-section of an illuminating system constructed in accordance with the teachings of the present invention.
Figure 2:
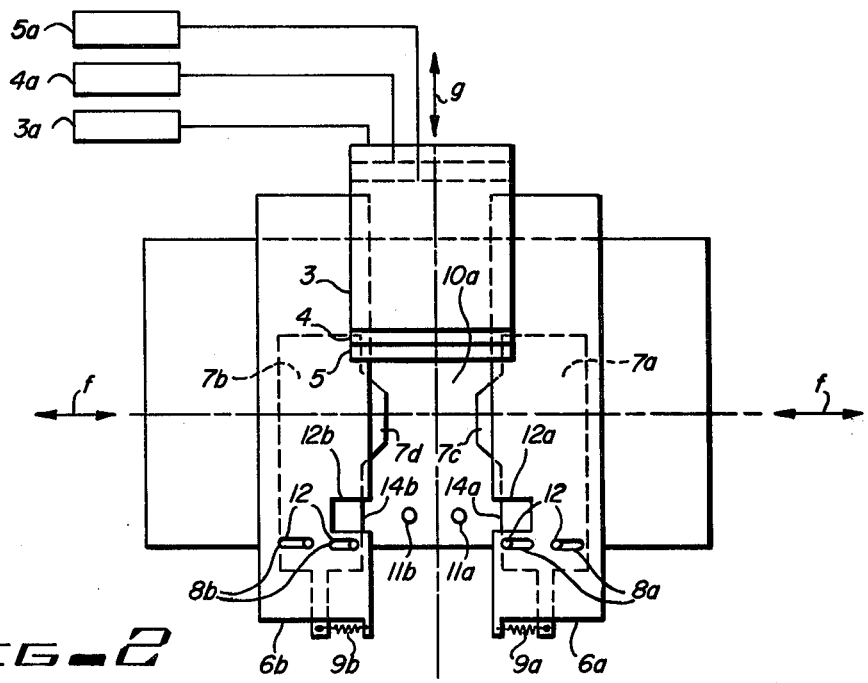
FIG. 2 is a schematic illustration of the illuminating system of FIG. 1 as viewed from lines 2—2 looking in the direction of the optical axis.

Auxiliary shutter strips 7a and 7b are biased by springs 9a and 9b in the direction of the optical axis a. These springs are also connected to strips 6a and 6b to maintain the relative positions of the shutters and auxiliary shutters as shown in FIG. 2. The force of the springs 9a and 9b causes the stops 12 on the auxiliary shutters to abut the end of the guides 8a and 8b in shutter strips 6a and 6b. Plate 10 contains a rectangular opening 10a for the light beam and two stops 11a and 11b which limit the travel of strips 7a and 7b. At a certain depth of insertion of the strips toward the optical axis a, the inside edge 14a and 14b of the strips contacts the stop and holds the strips in a fixed position. Therefore the auxiliary strips 7a and 7b are retained in this position while strips 6a and 6b continue to travel. The influence of the shaped parts 7c and 7d on the effective aperture is therefore reduced. The effective shape of the aperture is therefore changed at this point. FIG. 3 indicates a position of the strips, which has changed compared to the position shown in FIG. 2 and where the shape of the aperture is different compared to that of the starting condition. To allow a relative motion between the strips 6a and 6b and auxiliary strips 7a and 7b, the former are slotted (12a and 12b) for bypassing the stop 11a and 11b. At a certain depth of insertion, only the basic strips 6a and 6b are effective. As the motion is reversed in the direction of increased light intensity, the auxiliary strips become effective from a certain point as the shaped part of the auxiliary strips are exposed to light beams by the retracting strips 6a and 6b. By making the shape of the aperture dependent on the depth of insertion, it is possible to avoid changes in color composition with changes in light intensity. This is also the case regardless of the insertion of color filters 3, 4 and 5.

The light beam is partially colored, depending on the insertion depth of filters 3, 4 and 5 and is homogenized in a light mixer 13 with reflective inside walls. To insure improved mixing of the light, both entrance and exit ports of the light mixer are covered with matte glass discs 14 and 15. Disc 15 may have a cross-section which affects the light distribution. The light mixer 13 may have different lengths and shapes depending on the size of the negative 16 which is positioned below the mixer. The negative is projected by an objective lens (not shown) onto a projection surface (not shown).

In FIGS. 5 and 6, additional practical examples are shown of the illuminating system in which the relative motion of the auxiliary shutter strips 7a and 7b may follow, for example, a non-linear function of the depth of insertion of the shutter strips. For this purpose, plate 10 carries two curve discs or cams 18a and 18b (FIG. 5), rotatable about two fixed axes 17a and 17b. The cams control the auxiliary shutter strips 7a and 7b by protrusions 19a and 19b, and are directly connected with pinions 20a and 20b, which in turn are driven by racks 21a and 21b. These racks may be rigidly connected to shutter strips 6a and 6b, for example, so that their motion results in a rotation of cams 18a and 18b. Since the protrusions 19a and 19b are in intimate contact with the cams by action of the springs 9a and 9b, a relative motion of the auxiliary shutters 7a and 7b results with respect to the shutters 6a and 6b corresponding to the profile of the particular cam. The racks might also be adjusted independent of the shutter strips, but dependent on a separate adjustment system 22 (which is not described in detail) which also activates the shutter strips 6a and 6b.

The control of the motion of the auxiliary shutters may be achieved by a single double faced cam 23 (FIG. 6), which is rotatable about axis 24 mounted on plate 10. The profile of cam 23 controls both auxiliary shutter strips 7a and 7b so that a complete motion of the strips is produced in one-half revolution of the cam (which directly engages the protrusions 19a and 19b of the auxiliary shutter strips). Cam 23 is connected to a pinion 25, both rotating about axis 24, the pinion being driven by a rack 26. As can be seen from the drawing (FIG. 6), protrusions 19a and 19b touch the curve disc 23 only after a certain depth of insertion of the shutter strips. Therefore, the effective shutter shape remains unchanged for a certain amount of travel. This part of travel corresponds to a portion 26a of the rack 26 which carries no teeth and has no action upon the pinion 25. From a certain position of the shutter strips, the pinion engages the geared portion of the rack 26. This rack may be rigidly connected with the shutter strips or controlled separately by an adjustment system 28, which also controls the shutter strips.

The type of motion of the racks 21a, 21b, and 26 and the profile of the cams 18a, 18b and 23 depend upon the desired function of the relative motion between the shutter strips and the auxiliary shutter strips and may be determined, for example, empirically in a test series.

I claim:

1. In an illuminating system for color enlargement or copying having a filter of maximum density continuously insertable in a predetermined direction into a copy light beam passing through an aperture, the improvement comprising: a shutter positioned for insertion into said light beam in a direction normal to the direction of insertion of said filter, said shutter having a shape that varies as the shutter is inserted into the light beam to thereby vary the shape of said aperture.

2. The improvement of claim 1 wherein said shutter comprises a first shutter strip and an auxiliary shutter strip mounted for limited movement with and limited movement relative to said first shutter strip.

3. The improvement set forth in claim 2 wherein said auxiliary shutter strip includes an effective portion extendable beyond said first shutter strip into said light beam and wherein said effective portion incorporates a rectangular profile.

4. The improvement set forth in claim 2 wherein said auxiliary shutter strip includes an effective portion extendable beyond said first shutter strip into said light beam and wherein said effective portion incorporates a trapezoidal profile.

5. The improvement set forth in claim 2 wherein said auxiliary shutter strip includes an effective portion extendable beyond said first shutter strip into said light beam and wherein said effective portion incorporates a circular segmental profile.

6. The improvement set forth in claim 2 wherein said auxiliary shutter strip includes an effective portion extendable beyond said first shutter strip into said light beam and wherein said effective portion incorporates a triangular profile.

7. The improvement set forth in claim 2 wherein said auxiliary shutter strip includes an effective portion extendable beyond said first shutter strip into said light beam and wherein said effective portion incorporates a rounded profile.

8. The improvement set forth in claim 2 wherein said auxiliary shutter strip includes an effective portion extendable beyond said first shutter strip into said light beam and wherein said effective portion comprises a profile having a central inverted circular section.

9. The improvement set forth in claims 2, 3, 4, 5, 6, 7, or 8, wherein said auxiliary shutter is mounted on said first shutter and is movable relative thereto in a substantially parallel plane.

10. The improvement set forth in claim 9 wherein said auxiliary shutter is spring biased in the direction of an optical axis of the light beam.

11. The improvement set forth in claim 2 wherein relative motion between said shutter strip and auxiliary shutter strip is effected by a fixed stop that abuts said auxiliary shutter and limits the motion of said auxiliary shutter into said light beam.

12. The improvement set forth in claim 2 wherein relative motion between said shutter strip and auxiliary shutter strip is effected by a rotatable cam that abuts said auxiliary shutter and limits the movement thereof into said light beam.

* * * * *